May 6, 1952     A. E. QUEST     2,595,408
FLEXIBLE PIPE
Filed May 19, 1950     2 SHEETS—SHEET 1
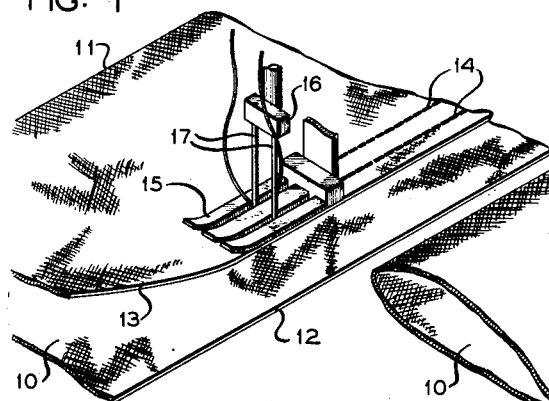
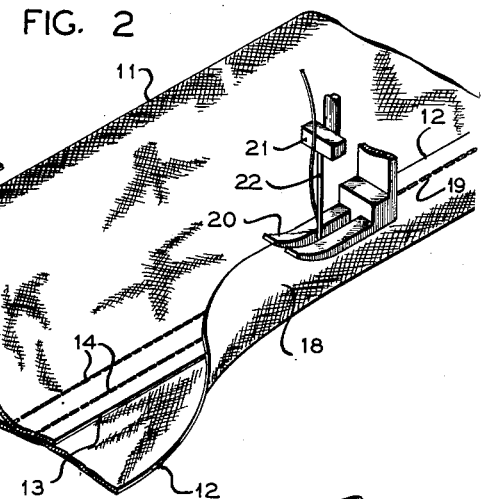
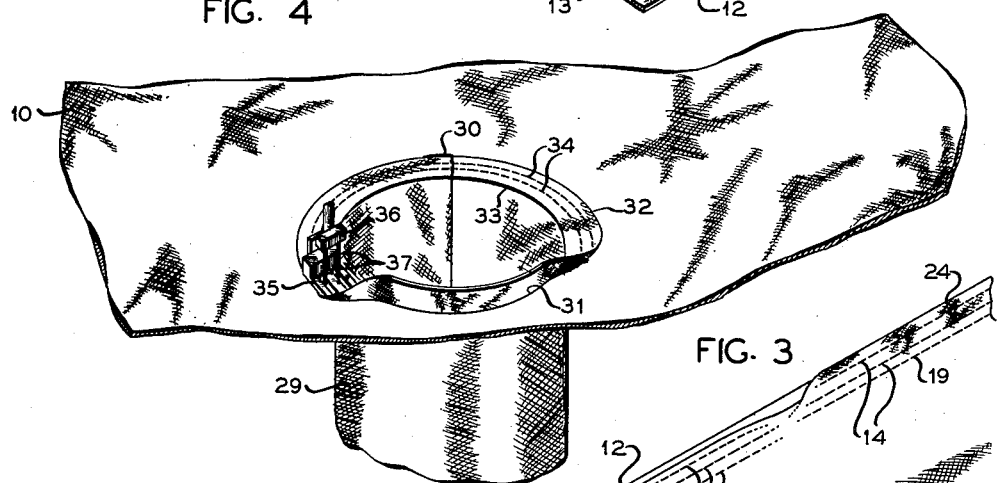
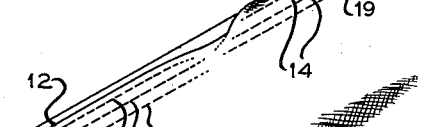
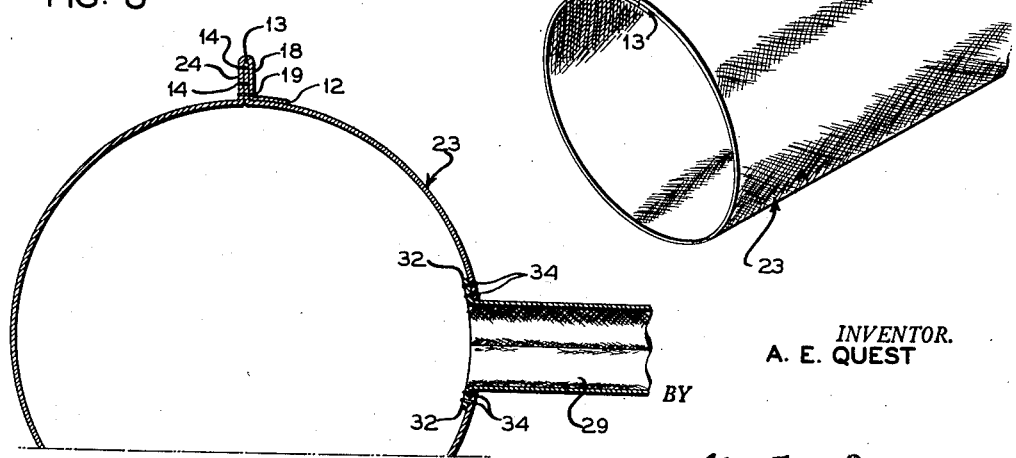
INVENTOR.
A. E. QUEST
BY
A. Yates Dowell
ATTORNEY May 6, 1952   A. E. QUEST   2,595,408
FLEXIBLE PIPE
Filed May 19, 1950   2 SHEETS—SHEET 2
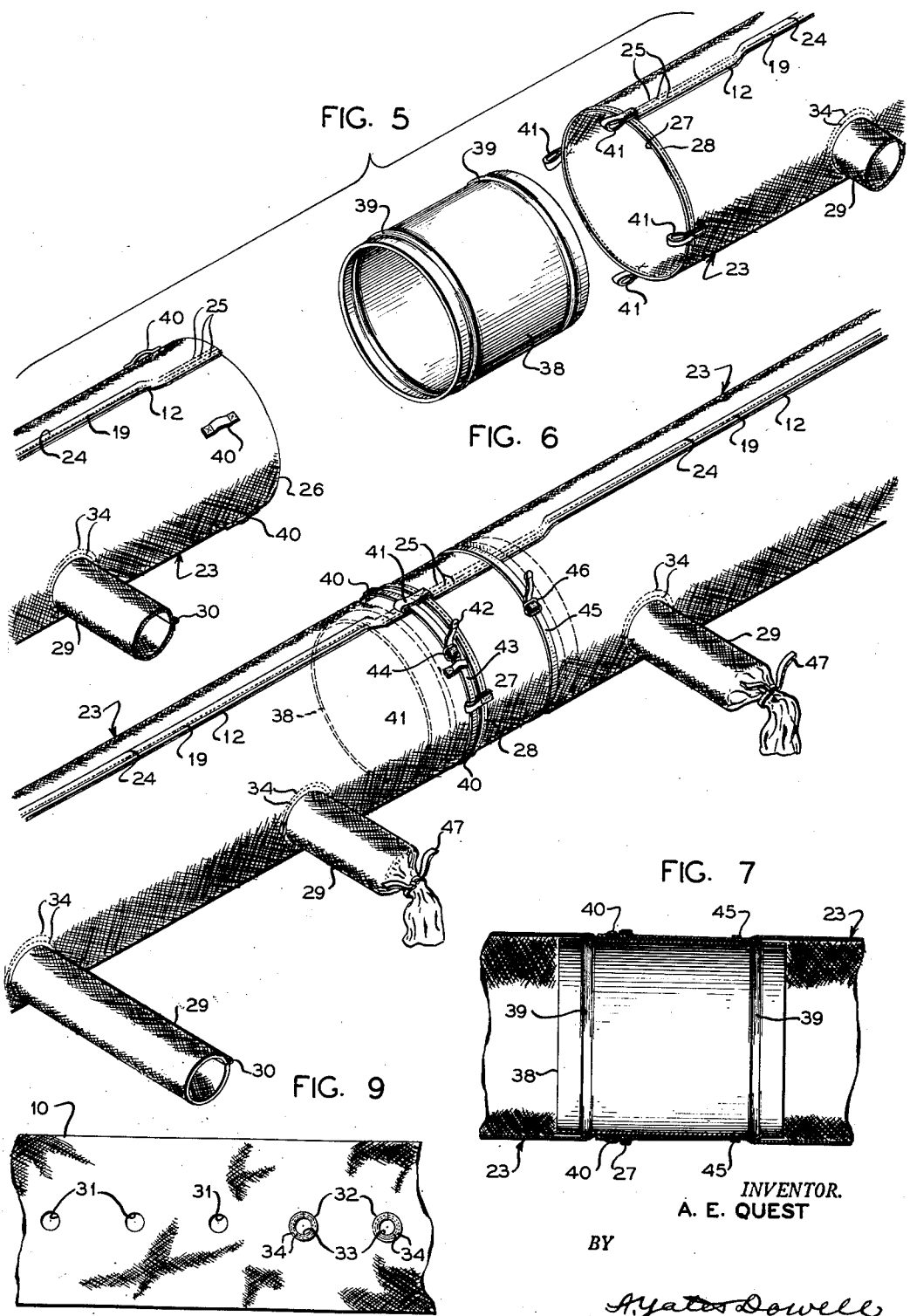
INVENTOR.
A. E. QUEST
BY
A. Yates Dowell
ATTORNEY Patented May 6, 1952

2,595,408

UNITED STATES PATENT OFFICE 2,595,408

FLEXIBLE PIPE

Arthur Eugene Quest, Lubbock, Tex.

Application May 19, 1950, Serial No. 162,921

11 Claims. (Cl. 61—12)

This invention relates to irrigation apparatus and systems, and more particularly to a novel method of manufacturing lengths of flexible hose or tubing and to an improved manner of assembling such lengths to provide an irrigation system of inherent flexibility and maximum efficiency.

Irrigation systems commonly employed generally provide a fixed or located conduit for carrying water from a source of supply to the terrain to be irrigated, outlets being provided to convey the water from the main conduit to desired channels. Such systems are first costly to install and, second, are devoid of flexibility being controlled by head gates or valves operable to control diversion of water into desired localities.

Such systems, being fixed in location, must be planned and installed to fit each location and, once in operation, are both troublesome and costly to change. It is accordingly a major object of the present invention to provide an irrigation system which will be portable in nature and which may be readily moved from place to place in accordance with required conditions and the convenience of the user.

It is a further object of the invention to provide a novel irrigation system which requires no installation other than a simple placing upon the surface of the ground or, if desired, the placing within a suitable trench or the like, the system including a conduit which will be flexible in all directions, requiring no supporting means of any character.

It is a further object of the invention to provide a novel conduit of the class set forth comprising a plurality of lengths of flexible hose or tubing which may be readily and conveniently assembled, in substantially end to end relationship, to provide any over-all length required or desired.

It is a still further object of the invention to provide a novel conduit of the class set forth including flexible, spaced outlets or sleeves with novel means for mounting such outlets upon the conduit.

It is a still further object of the present invention to provide, in an irrigation system of the class set forth, novel means for independently controlling the flow from each outlet whereby maximum distribution may be obtained, in accordance with conditions desired.

Further objects and advantages of the invention will be apparent from the following specification taken in conjunction with the accompanying drawings, wherein:

Fig. 1 is a fragmentary perspective view illustrating, somewhat diagrammatically, the first step in the fabrication of the novel conduit or sleeve, in accordance with the teachings of the present invention;

Fig. 2, a fragmentary perspective, similar to Fig. 1, illustrating the second step in the fabrication of the novel conduit or sleeve;

Fig. 3, a fragmentary perspective view of one extremity of the novel conduit;

Fig. 4, a fragmentary perspective view illustrating, on a slightly enlarged scale, the manner of securing an outlet sleeve to the material of the conduit, prior to the fabrication of the latter;

Fig. 5, a perspective view illustrating opposed extremities of two sections of conduit in expanded relationship with a coupling member positioned therebetween;

Fig. 6, a perspective view of an assembled joint between two sections of conduit;

Fig. 7, a fragmentary sectional view taken longitudinally through the joint of Fig. 6;

Fig. 8, a fragmentary transverse sectional view through a conduit section and outlet sleeve; and, Fig. 9, a plan view of a portion of material prior to the fabrication therefrom of a conduit and illustrating two of the outlet sleeves secured thereto.

As shown in the drawings, the novel conduit sections and sleeves of the instant invention are formed from any suitable flexible material, such as canvas or the like. It will be understood, however, that the invention is by no means limited to the use of canvas, and other materials such as synthetic fabrics and/or plastics may be conveniently employed. Where fabric is utilized, such as the canvas illustrated, the material is preferably impregnated with a suitable waterproofing compound or otherwise rendered substantially impervious to the passage of fluid, as is well known in this and related arts.

There has been illustrated in Figs. 1 and 2 of the drawings the first two steps in the fabrication of a conduit section. Preferably the material 10, which is of any desired length and of an appropriate width in accordance with the diameter of finished conduit required, if folded upon itself as indicated at 11 with the edge 12 extending beyond or overlapping the edge 13 a distance of approximately one inch. The superimposed layers of fabric are then stitched together with a double row of stitching 14, any suitable sewing mechanism being employed. Such mechanism has been conventionally illustrated in Fig. 1 as including a presser foot 15, needle bar 16, and a pair of needles 17. Preferably the stitching 14 is commenced a distance of some eighteen inches from an extremity of the conduit section and is continued to a point some eighteen inches removed from the opposite end of the section, thereby leaving the extremities of the overlapping edge 13 free or unstitched for a purpose to be hereinafter more fully described.

Upon the completion of this step in the fabrication of each conduit section, the edge 12 of the material is folded over the edge 13, the width of this fold 18 being sufficient to cover the stitching 14, and the overlapping portion is then secured to the previously stitched material by a single row of stitching 19, the extent of the stitching 19 being substantially identical with the length of the stitching 14, leaving the extremities of the conduit section unstitched as stated hereabove. Sewing mechanism suitable for providing the stitching 19 has been conventionally illustrated in Fig. 2 of the drawings as including the presser foot 20, needle bar 21, and single needle 22.

It will be obvious that there has thus been formed, from a single length of flat material, a tubular conduit section 23 which, when distended as indicated in Fig. 3 of the drawings, includes a longitudinally stitched folded portion or rib 24 extending to approximately eighteen inches from each extremity of the conduit section. The free, overlapping portions of material adjacent the extremities of the conduit section are then stitched to each other as indicated at 25, preferably three rows of stitching being employed, to provide a substantially smooth interior and exterior surface with a flat seam adjacent each extremity of the conduit section. One extremity 26 of each conduit section 23 is permitted to remain as thus described while the opposite extremity 27 is folded upon itself and stitched as indicated at 28, particular reference being had to Fig. 5 of the drawings, to provide an annular reinforcing edge.

As has been previously stated, length and diameter of the required conduit sections are first determined and, simultaneously, length and diameter of outlet sleeves 29, intended to be secured to each conduit section in communication with the interior thereof, are also determined. It will be understood that these outlet sleeves, which project or extend laterally from the conduit sections, are of substantially smaller diameter and length than said conduit sections.

These outlet sleeves are preferably fabricated in substantially identical manner as the conduit sections except that the several rows of stitching extend from end to end of each sleeve providing a longitudinally stitched folded portion or rib 30, there being no necessity for flat seams at the extremities of these sleeves.

A preferred method of securing the sleeves 29 to the material 10 of the conduit section, prior to the fabrication of the latter, has been illustrated more particularly in Figs. 4 and 9 of the drawings. Each length of flat material or fabric 10 is provided with a plurality of longitudinally spaced and aligned apertures 31 of a diameter substantially corresponding to the distended exterior diameter of the outlet sleeve. An extremity 32 of a sleeve is then inserted within an aperture 31 and folded at 33 over the material 10 from which a conduit section is to be formed. The folded over portion of the sleeve 29 forms an annular flange upon the sleeve which is then stitched securely to the material 10, a double row of stitching 34 being provided. Any suitable sewing mechanism may be employed as, for example, a device conventionally illustrated as including a presser foot 35, needle bar 36, and a pair of needles 37. Each conduit section 23 may be provided with as many outlet sleeves 29 as desired, uniformly or otherwise spaced longitudinally of the conduit section to provide the required distribution of water. While the sleeves 29 have been disclosed in Fig. 6 of the drawings as extending in a single direction from the conduit sections illustrated, it will be obvious that these sleeves may be mounted upon the conduit sections so as to extend laterally in opposite directions whereby water may be distributed on both sides of the conduit.

Novel means is provided for assembling a plurality of conduit sections 23. Preferably such means comprises a tubular and substantially rigid coupling member 38 provided with an annular raised bead 39 adjacent each extremity thereof, as illustrated in detail in Figs. 5 and 7 of the drawings. Preferably the exterior diameter of the coupling member 38 is substantially that of the interior of the distended conduit sections so that this coupling member may be readily and conveniently slipped thereinto.

Each conduit section is provided with a plurality of circumferentially spaced loops 40 positioned adjacent the extremity 26 and inwardly thereof. The opposite extremity 27 of each conduit section, such extremity comprising the annular reinforcing rim or edge 28, is provided with a plurality of circumferentially spaced loops 41 preferably extending beyond the edge 28 and spaced in offset or staggered relationship with respect to the loops 40. The assembly of adjacent extremities of conduit sections is accomplished with particular ease. One extremity of the coupling member 38 is inserted into the open end 26 of a conduit section to a position where the annular bead 39 is slightly beyond the loops 40. The adjacent extremity 27 of the succeeding or next conduit section is then drawn over this coupling member and over the extremity 26 of the conduit section positioned thereupon until the loops 41 are in substantial and circumferential alignment with the loops 40. An extremity 42 of a suitable flexible member such as a strap or other fastening means 43 is then threaded through the aligned loops and engaged with a buckle or the like 44 provided upon the opposite end of the strap, thus retaining the strap against displacement. Tightening of the strap will bind the extremity of the conduit section upon the coupling member, the raised annular bead 39 preventing lateral displacement. Preferably a second flexible member or strap 45 including a buckle 46 or other fastening element is also employed and is positioned upon the conduit section and coupling member just within the opposed annular bead 39 for further assisting in maintaining the joint or coupling secure.

It has been found in practice that, with the joint assembly as above described, no water leakage is had at the coupling, an important factor in connection with controlled irrigation.

Suitable means are provided for regulating flow from each of the outlet sleeves. A preferred form of such means comprises a flexible member such as a strap 47 or the like, tied about each outlet sleeve at a point removed from the free extremity thereof. It will be readily apparent that tightening of each strap 47 will constrict the sleeve 29 thereby restricting the flow of water therethrough. Thus, in a single irrigation system, varying degrees of flow may be provided through a plurality of outlet sleeves, in accordance with the quantity of water required or conditions of irrigation desired immediately adjacent each outlet.

There has thus been described an irrigation system and apparatus having a degree of flexibility heretofore unknown in this art. Conduit sections and laterally disposed outlet sleeves are fabricated in a particularly simple manner, from preformed pieces of material especially tailored to meet any required conditions. The over all length of the system is of little importance or concern since as many sections as required may be readily coupled or united, it being contemplated that the extremity of the section remote from the source of supply will be provided with an adequate closure designed to prevent passage and loss of water therethrough. Each outlet sleeve is provided with independently operable regulating means for controlling flow therethrough and adjustment or variation of flow through one or more of these outlets has no bearing on flow through the remainder of the system.

The nature of the terrain upon which the system is installed is of no importance since the flexible material from which conduit sections and outlet sleeves are fabricated permit of installation in complete conformation with topographical conditions and with no requirement for supporting means of any character.

The system may be as readily installed in a geometrically straight line as in an undulating path. It may wind through an orchard, or the like, providing proper irrigation for each tree therein or it may be employed in connection with crops of any character where planting has been carefully planned in accordance with conditions of surface contour.

A single section may be easily replaced, with no necessity for disturbing the entire system. No problems of weight are provided, whereby portability of the system is restricted and, where storage during the winter season is desirable, the collapsible nature of each section obviates any requirement for substantial storage space. An economy of manufacture, installation, and maintenance is provided resulting in an improved system of maximum efficiency without regard to the size thereof.

It will be understood that various changes may be made in the invention without departing from the spirit and scope thereof and therefore the invention is not limited by that which is illustrated in the drawings and described in the specification but only as indicated in the appended claims.

What is claimed is:

1. In an irrigation system, a plurality of flexible conduit sections each of which is formed from a relatively long preformed strip of substantially impervious flexible material the longitudinal edges of which are overlapped and securely stitched from a point adjacent one extremity thereof to a point adjacent the opposite extremity to provide a longitudinally extending reinforcing rib, said longitudinal edges beyond said rib being securely stitched to provide a substantially flat seam, each of said conduit sections being provided with a plurality of longitudinally spaced apertures, a laterally disposed outlet sleeve positioned in each of said apertures, the exterior diameter of each of said sleeves being such as to provide a relatively snug fit within the associated aperture, said sleeves being formed from preformed lengths of impervious flexible material the longitudinal edges of which are overlapped and securely stitched to provide a longitudinally extending reinforcing rib, with the inner ends of said sleeves securely stitched to the material of said conduit section in surrounding relationship to the aperture to provide a relatively fluid-tight joint, a flexible member engaged with each outlet sleeve intermediate the extremities thereof in surrounding relationship to said sleeve for controlling flow from said conduit through said sleeve, an annular reinforcing edge on one extremity of said conduit section, a plurality of circumferentially spaced loops securely stitched to said conduit section immediately adjacent said reinforcing edge and extending therebeyond, a plurality of circumferentially spaced loops secured to said conduit section adjacent the opposite extremity thereof, and means for connecting adjacent extremities of aligned conduit sections, said means comprising a rigid tubular coupling having one extremity thereof inserted within an extremity of a conduit section a distance beyond the circumferentially spaced loops, the opposite extremity of said coupling being inserted into the reinforced extremity of the successive conduit section a distance where the circumferentially spaced loops on the reinforced edge will be in alignment with the loops on said first mentioned section, a flexible member engaging with said aligned loops for tightening said adjacent conduit extremities upon said coupling, means for securing said flexible member in adjusted position, and a second flexible member engaging said conduit section and coupling.

2. In an irrigation system, a plurality of flexible conduit sections each of which is formed from a relatively long preformed strip of substantially impervious flexible material the longitudinal edges of which are overlapped and secured to each other from a point adjacent one extremity thereof to a point adjacent the opposite extremity to provide a longitudinally extending reinforcing rib, said longitudinal edges beyond said rib being secured to each other to provide a substantially flat seam, each of said conduit sections being provided with a plurality of longitudinally spaced apertures, a laterally disposed outlet sleeve positioned in each of said apertures, the exterior diameter of each of said sleeves being such as to provide a relatively snug fit within the associated aperture, said sleeves being formed from preformed length of impervious flexible material the longitudinal edges of which are overlapped and secured to each other to provide a longitudinally extending reinforcing rib, with the inner ends of said sleeves secured to the material of said conduit section in surrounding relationship to said aperture to provide a relatively fluid tight joint, a flexible member engaged with each outlet sleeve intermediate the extremities thereof in surrounding relationship to said sleeve for controlling flow from said conduit through said sleeve, an annular reinforcing edge on one extremity of said conduit section, a plurality of circumferentially spaced loops secured to said conduit section immediately adjacent said reinforcing edge and extending therebeyond, a plurality of circumferentially spaced loops secured to said conduit section adjacent the opposite extremity thereof, means for connecting adjacent extremities of aligned conduit sections, said means comprising a rigid tubular coupling member inserted into said adjacent extremities to a point where the circumferentially spaced loops are in alignment, and a flexible member engaging in said aligned loops for tightening said adjacent conduit extremities upon said coupling.

3. In an irrigation system, a plurality of flexible conduit sections each of which is formed from a relatively long preformed strip of substantially impervious flexible material the longitudinal edges of which are overlapped and secured to each other from a point adjacent one extremity thereof to a point adjacent the opposite extremity, said longitudinal edges beyond said overlapped portion being secured to each other to provide a substantially flat seam, each of said conduit sections being provided with a plurality of longitudinally spaced apertures, a laterally disposed outlet sleeve positioned in each of said apertures, the exterior diameter of each of said sleeves being such as to provide a relatively snug fit within the associated aperture, said sleeves being formed from preformed length of impervious flexible material the longitudinal edges of which are overlapped and secured to each other with the inner ends of said sleeves secured to the material of said conduit section in surrounding relationship to said aperture to provide a relatively fluid-tight joint, a flexible member engaged with each outlet sleeve for controlling flow from said conduit through said sleeve, an annular reinforcing edge on one extremity of said conduit section, a plurality of circumferentially spaced loops secured to said conduit section immediately adjacent said reinforcing edge and extending therebeyond, a plurality of circumferentially spaced loops secured to said conduit section adjacent the opposite extremity thereof, a coupling for connecting adjacent extremities of aligned conduit sections comprising a rigid tubular member inserted into said adjacent conduit extremities to a point where the circumferentially spaced loops are in alignment, and a flexible member engaging in said aligned loops for tightening said adjacent conduit extremities upon said coupling.

4. In an irrigation system, a plurality of flexible conduit sections each of which is formed from a relatively long preformed strip of substantially impervious flexible material the longitudinal edges of which are secured to each other, a relatively flat seam being provided adjacent each extremity, each of said conduit sections being provided with a plurality of longitudinally spaced apertures, a laterally disposed outlet sleeve positioned in each of said apertures, the exterior diameter of each of said sleeves being such as to provide a relatively snug fit within the associated aperture, said sleeves being formed from preformed lengths of relatively impervious flexible material the longitudinal edges of which are secured to each other with the inner ends of said sleeves secured to the material of the conduit section in surrounding relationship to said aperture to provide a relatively fluid-tight joint, an annular reinforcing edge on one extremity of said conduit section, a plurality of circumferentially spaced loops secured to said conduit section immediately adjacent said reinforcing edge and extending therebeyond, a plurality of circumferentially spaced loops secured to said conduit section adjacent the opposite extremity thereof, a coupling for connecting adjacent extremities of aligned conduit sections comprising a rigid tubular member inserted into said adjacent conduit extremities to a point where the circumferentially aligned loops are in alignment, and a flexible member engaging in said aligned loops for tightening said adjacent conduit extremities upon said coupling.

5. In an irrigation system, a plurality of flexible conduit sections each of which is formed from a relatively long preformed strip of substantially impervious flexible material the longitudinal edges of which are united, each of said conduit sections being provided with a plurality of longitudinally spaced apertures, an outlet sleeve positioned in each of said apertures, said sleeves being formed from preformed lengths of relatively impervious flexible material the longitudinal edges of which are united with the inner ends of said sleeves secured to the material of the conduit section in surrounding relationship to said aperture to provide a fluid-tight joint, an annular reinforcing edge on one extremity of said conduit section, a plurality of circumferentially spaced loops secured to said conduit section immediately adjacent said reinforcing edge and extending therebeyond, a plurality of circumferentially spaced loops secured to said conduit section adjacent the opposite extremity thereof, a coupling for connecting adjacent extremities of aligned conduit sections comprising a rigid tubular member inserted into said adjacent extremities to a point where the circumferentially spaced loops are in alignment, and a flexible member engaging in said aligned loops for tightening said adjacent conduit extremities upon said coupling.

6. In an irrigation system, a plurality of flexible conduit sections each of which is formed from a relatively long preformed strip of substantially impervious flexible material united along the longitudinal edges thereof, each of said conduit sections being provided with a plurality of longitudinally spaced apertures, an outlet sleeve positioned in each of said apertures, said sleeves being formed from preformed lengths of relatively impervious flexible material united along the longitudinal edges thereof with the inner ends of said sleeves secured to the material of the conduit section in surrounding relationship to the associated aperture, an annular reinforcing edge on one extremity of said conduit, a plurality of circumferentially spaced loops secured to said conduit section immediately adjacent said reinforcing edge and extending therebeyond, a plurality of circumferentially spaced loops secured to said conduit section adjacent the opposite extremity thereof, a coupling for connecting adjacent extremities of aligned conduit sections, and a flexible member engaging in the loops on the extremity of one section and on the extremity of the successive section for tightening said extremities upon said coupling.

7. In an irrigation system, a plurality of flexible conduit sections each of which is formed from a relatively long preformed strip of substantially impervious flexible material united along the longitudinal edges thereof, each of said sections being provided with a plurality of longitudinally spaced apertures, a flexible outlet sleeve positioned with the inner ends of said sleeves secured to the material of the conduit section in surrounding relationship to the associated aperture, a plurality of circumferentially spaced loops secured to an extremity of said conduit section and extending therebeyond, a plurality of circumferentially spaced loops secured to said conduit section adjacent the opposite extremity thereof, and a flexible member engaging in the loops on an extremity of one conduit section and the loops in the adjacent extremity of the successive section for connecting said conduit section to each other.

8. A flexible conduit section formed from a relatively long strip of substantially impervious flexible material united along the longitudinal edges thereof and provided with a plurality of longitudinally spaced apertures, a laterally disposed outlet sleeve positioned in each of said apertures, the exterior diameter of each of said sleeves being such as to provide a relatively snug fit within the associated aperture, said sleeves being formed from lengths of substantially impervious flexible material united along the longitudinal edges thereof with the inner ends of said sleeves secured to the material of said conduit section in surrounding relationship to the aperture to provide a relatively fluid-tight joint, a flexible member engaged with each outlet sleeve intermediate the extremities thereof in surrounding relation to said sleeve for controlling flow from said conduit through said sleeve, an annular reinforcing edge on one extremity of said conduit section, a plurality of circumferentially spaced loops secured to said conduit section immediately adjacent said reinforcing edge and extending therebeyond, and a plurality of circumferentially spaced loops secured to said conduit section adjacent the opposite extremity thereof.

9. A flexible conduit section formed from a relatively long strip of substantially impervious flexible material united along the longitudinal edges thereof and provided with a plurality of longitudinally spaced apertures, an outlet sleeve disposed in each of said apertures, said sleeves being formed from length of substantially impervious flexible material united along the longitudinal edges thereof with the inner ends of said sleeves secured to the material of the conduit section in surrounding relationship to the associated aperture, an annular reinforcing edge on one extremity of said conduit section, a plurality of circumferentially spaced loops secured to said conduit section immediately adjacent said reinforcing edge and extending therebeyond, and a plurality of circumferentially spaced loops secured to said conduit section adjacent the opposite extremity thereof.

10. A flexible conduit section formed from a relatively long strip of substantially impervious flexible material united along the longitudinal edges thereof and provided with a plurality of longitudinally spaced apertures, an outlet sleeve disposed in each aperture with the inner end of each flange secured to the material of said conduit section in surrounding relationship with respect to the associated aperture, a plurality of circumferentially spaced loops secured to one extremity of said conduit section and extending therebeyond, and a plurality of circumferentially spaced loops secured to said conduit section adjacent the opposite extremity.

11. A flexible conduit section formed from a tubular strip of substantially impervious flexible material provided with a plurality of spaced apertures, an outlet sleeve having its inner end secured to the material of said conduit section about the associated aperture, a plurality of circumferentially spaced loops secured to one extremity of said conduit section, and a plurality of circumferentially spaced loops secured to said conduit section adjacent the opposite extremity.

ARTHUR EUGENE QUEST.

REFERENCES CITED

The following references are of record in the file of this patent:

UNITED STATES PATENTS

| Number | Name | Date |
| --- | --- | --- |
| Re. 14,081 | Linxweiler | May 7, 1916 |
| 133,044 | Libby | Nov. 12, 1872 |
| 1,143,351 | Benson | June 15, 1915 |
| 1,381,427 | Patrick | June 14, 1921 |
| 1,989,427 | Robey | Jan. 29, 1935 |